(12) United States Patent
Farkas (10) Patent No.: US 11,171,405 B2
(45) Date of Patent: Nov. 9, 2021

(54) PLANAR FLEXIBLE RF TAG AND CHARGING DEVICE

(71) Applicant: ISOLYNX, LLC, Haverhill, MA (US)

(72) Inventor: Alexander T. Farkas, Chatham, MA (US)

(73) Assignee: ISOLYNX, LLC, Haverhill, MA (US)

( * ) Notice: Subject to any disclaimer, the term of this patent is extended or adjusted under 35 U.S.C. 154(b) by 672 days.

(21) Appl. No.: 15/648,315

(22) Filed: Jul. 12, 2017

(65) Prior Publication Data
US 2018/0019513 A1 Jan. 18, 2018

Related U.S. Application Data

(60) Provisional application No. 62/361,359, filed on Jul. 12, 2016.

(51) Int. Cl.
*H01Q 1/22* (2006.01)
*H01Q 9/28* (2006.01)
(Continued)

(52) U.S. Cl.
CPC .......... *H01Q 1/2225* (2013.01); *H01Q 1/273* (2013.01); *H01Q 9/285* (2013.01); *H01Q 21/065* (2013.01);
(Continued)

(58) Field of Classification Search
CPC ......... H01Q 1/2225; H01Q 1/273–276; H01Q 21/065; H02J 50/27; G07F 17/3239
See application file for complete search history.

(56) References Cited

U.S. PATENT DOCUMENTS 8,045,947 B2 * 10/2011 Mandal .................. H01Q 1/22
455/299
8,989,880 B2 3/2015 Wohl et al.
(Continued)

FOREIGN PATENT DOCUMENTS

WO WO 2014/197575 12/2014
WO WO 2014/197618 12/2014
(Continued)

OTHER PUBLICATIONS

PCT/US2017/041672 International Preliminary Report on Patentability dated Jan. 15, 2019, 10 pp.
(Continued)

*Primary Examiner* — Andrea Lindgren Baltzell
*Assistant Examiner* — Amal Patel
(74) *Attorney, Agent, or Firm* — Lathrop GPM LLP (57) ABSTRACT

A planar flexible ultra-wide band (UWB) RF antenna includes a flexible non-electrically-conductive substrate and at least one antenna patch having electrically conductive metal positioned on one side of the flexible non-electrically-conductive substrate and having geometry defining a wirelessly transmitted UWB signal. The antenna may electrically couple with an RF transmitter circuit formed on a second side of the flexible substrate and controlled by a microcontroller circuit, formed on the second side, to transmit a radio signal. The RF tag may include at least one decoupling circuit directly electrically connected to the RF antenna and having a decoupling frequency that is different from a transmitting frequency of the antenna. The decoupling circuit transfers power from the antenna when the antenna receives capacitive power from an external non-electrical contact charger operating at the decoupling frequency and having at least one plate of similar geometry to the at least one antenna patch.

19 Claims, 9 Drawing Sheets

(51) Int. Cl.
*H02J 50/20* (2016.01)
*H02J 50/00* (2016.01)
*H01Q 21/06* (2006.01)
*H01Q 1/27* (2006.01)
*H04W 4/029* (2018.01)
*H02J 50/27* (2016.01)
*G07F 17/32* (2006.01)

(52) U.S. Cl.
CPC ............ *H02J 50/005* (2020.01); *H02J 50/20* (2016.02); *G07F 17/3239* (2013.01); *H02J 50/27* (2016.02); *H04W 4/029* (2018.02)

(56) References Cited

U.S. PATENT DOCUMENTS

| | | | |
|---|---|---|---|
| 9,002,485 | B2 | 4/2015 | Wohl et al. |
| 9,014,830 | B2 | 4/2015 | Wohl et al. |
| 9,180,357 | B2 | 11/2015 | Richley |
| 9,517,417 | B2 | 12/2016 | Austerlade et al. |
| 9,531,415 | B2 | 12/2016 | Stelfox et al. |
| 9,571,143 | B2 | 2/2017 | Richley |
| 9,602,152 | B2 | 3/2017 | Wohl et al. |
| 9,667,287 | B2 | 5/2017 | Richley |
| 9,698,841 | B2 | 7/2017 | Alonso et al. |
| 9,699,278 | B2 | 7/2017 | Richley et al. |
| 9,715,005 | B2 | 7/2017 | Hughes et al. |
| 9,742,450 | B2 | 8/2017 | O'Hagan et al. |
| 2001/0007335 | A1* | 7/2001 | Tuttle .................. G01S 13/758 235/492 |
| 2003/0163287 | A1 | 8/2003 | Vock et al. |
| 2003/0201946 | A1* | 10/2003 | Sheen ................ H01Q 21/065 343/872 |
| 2005/0088344 | A1* | 4/2005 | Saitou ...................... H01Q 9/28 343/700 MS |
| 2007/0279309 | A1 | 12/2007 | Schultheiss et al. |
| 2008/0252543 | A1 | 10/2008 | Pettus |
| 2009/0213012 | A1 | 8/2009 | Jiang et al. |
| 2011/0266882 | A1 | 11/2011 | Yamamoto et al. |
| 2013/0009851 | A1 | 1/2013 | Danesh |
| 2014/0117927 | A1 | 5/2014 | Chateau et al. |
| 2014/0274139 | A1 | 9/2014 | Bilal et al. |
| 2014/0361875 | A1 | 12/2014 | O'Hagan et al. |
| 2014/0361890 | A1 | 12/2014 | O'Hagan et al. |
| 2014/0361906 | A1 | 12/2014 | Hughes et al. |
| 2014/0362120 | A1 | 12/2014 | Wohl et al. |
| 2014/0364973 | A1 | 12/2014 | O'Hagan et al. |
| 2014/0364977 | A1 | 12/2014 | Wohl et al. |
| 2014/0365194 | A1 | 12/2014 | O'Hagan et al. |
| 2014/0365415 | A1 | 12/2014 | Stelfox et al. |
| 2014/0365639 | A1 | 12/2014 | Wohl et al. |
| 2014/0365640 | A1 | 12/2014 | Wohl et al. |
| 2015/0116296 | A1 | 4/2015 | Greene |
| 2015/0149250 | A1 | 5/2015 | Fein et al. |
| 2015/0149837 | A1* | 5/2015 | Alonso .................. G07F 17/32 714/57 |
| 2015/0178817 | A1 | 6/2015 | Fein et al. |
| 2015/0199602 | A1 | 7/2015 | Van Der Weide et al. |
| 2015/0335952 | A1 | 11/2015 | Wohl et al. |
| 2015/0335953 | A1 | 11/2015 | Wohl et al. |
| 2015/0335954 | A1 | 11/2015 | Wohl et al. |
| 2015/0378002 | A1 | 12/2015 | Hughes et al. |
| 2015/0379387 | A1 | 12/2015 | Richley |
| 2016/0006132 | A1* | 1/2016 | Lee ........................ H01Q 21/24 343/835 |
| 2016/0361595 | A1 | 12/2016 | O'Hagan et al. |
| 2017/0043260 | A1 | 2/2017 | Austerlade et al. |
| 2017/0056721 | A1 | 3/2017 | Stelfox et al. |
| 2017/0173387 | A1 | 6/2017 | Wohl et al. |
| 2017/0257127 | A1 | 9/2017 | Alonso et al. |
| 2017/0272556 | A1 | 9/2017 | Richley et al. |
| 2017/0317702 | A1 | 11/2017 | O'Hagan et al. |

FOREIGN PATENT DOCUMENTS

| | | |
|---|---|---|
| WO | WO 2014/197623 | 12/2014 |
| WO | WO 2014/197679 | 12/2014 |
| WO | WO 2016/196863 | 12/2016 |

OTHER PUBLICATIONS

International Search Report with Written Opinion corresponding to International Patent Application No. PCT/US2017/041672, dated Nov. 17, 2017, 17 pages.

European Patent Application No. 17 828 365.1; Extended European Search Report and Opinion dated Mar. 4, 2020; 9 pages.

New Zealand Patent Application No. 750137; Patent Examination Report 1 dated Oct. 20, 2020; 4 pages.

* cited by examiner

PLANAR FLEXIBLE RF TAG AND CHARGING DEVICE

RELATED APPLICATIONS

This application claims priority to U.S. Patent Application No. 62/361,359, titled "Planar Flexible RF Tag and Charging Device", filed Jul. 12, 2016, which is incorporated herein by reference.

BACKGROUND

Historically, ultra-wide band (UWB) radio-frequency (RF) tracking tags that operate within the RF tracking space have faced significant barriers to adoption due to the geometry and weight of these RF tracking tags that resulted from the need to generate a propagation pattern (shape and range) necessary for use in large sporting venues (e.g., a National Football League (NFL) stadium). Specifically, the need for an antenna with three-dimensional (3D) geometry and a battery of sufficient power to meet the transmission needs has resulted in a minimum size and weight of the RF tracking tag, even when optimized, that is still obtrusive when configured with athletic equipment. The use of anything other than an 3D antenna for RF tracking tags has not been considered.

Given the 3D structure of the antenna and the size and weight of the battery, the RF tracking tag is made to be mechanically rigid, typically having a hard enclosure to provide protection to the antenna, electronics and battery. Although this enclosure is protective, its rigid nature also makes it fragile when exposed to bending forces since it breaks rather than flexes.

All known microwave patch antennas are driven "single ended" or "unbalanced" and most have propagation patterns biased unidirectionally toward the normal axis of the patch. Thus, type of biased propagation pattern is not suitable for use within RF tracking tags. Further, RF tracking tag transceiver input and output circuits are often "balanced" or "differential" or "complementary" owing to the internal structure of the integrated circuit technology. Therefore, to use the traditional microwave patch antenna, a "balun" (balanced-to-unbalanced converter) is required to translate balanced to unbalanced (single-ended) RF currents for delivery to the traditional microwave patch antenna. The balun causes loss that results in reduced transceiver performance and reduced operational range, or requires additional power and associated size increase of a battery providing the power, making the microwave patch antenna even less suitable for use in RF tracking tags.

SUMMARY

When using electronic ultra-wide band (UWB) radio-frequency (RF) tags to track individuals, such as athletes, it is necessary to make the electronics as small, unobtrusive and robust as possible, while maintaining performance of the UWB RF tags. The embodiments hereof include a real-time location system RF Tag that has a flat, flexible, and waterproof form factor that is ideal for integration into athletic uniforms, equipment and other clothing. Embodiments include nonelectrical contact rechargeable battery system and an antenna with a propagation pattern optimized for sports tracking. Within the document is also a description of the external battery charger.

In one embodiment, a planar flexible UWB RF antenna includes a flexible non-electrically-conductive substrate and an antenna patch having electrically conductive metal positioned on one side of the flexible non-electrically-conductive substrate and having geometry defining a wirelessly transmitted UWB signal.

In another embodiment, a planar complementary patch antenna includes a flexible non-electrically-conductive substrate, first and second antenna patches positioned apart from each other on one side of the flexible non-electrically-conductive substrate, and a differential input having (a) a first feed element electrically coupled directly to only the first antenna patch and (b) a second feed element electrically coupled directly to only the second antenna patch, the differential input being drivable from a differential output of an RF transmitter circuit to generate a wireless signal from the complementary patch antenna.

In another embodiment, a dual-purpose antenna includes a first electrically conductive metal antenna element and a second electrically conductive metal antenna element configured such that: the dual-purpose antenna transmits a wireless signal at transmission frequency and propagation pattern defined by geometry of the first and second antenna elements, and the dual-purpose antenna receives, without electrical contact, capacitive power across two different capacitors each formed in part by a different one of the first and second antenna elements.

In another embodiment, a planar flexible RF tag for use in a real-time location system includes a flexible substrate, at least one antenna patch formed on a first side of the flexible substrate, an RF transmitter circuit electrically coupled to the at least one antenna patch and formed on a second side of the flexible substrate, and a microcontroller circuit formed on the second side and electrically coupled to control the RF transmitter circuit to drive the at least one antenna patch to transmit a radio signal.

In another embodiment, a planar flexible RF tag for use in a real-time location system includes a flexible substrate, first and second antenna patches formed as complementary plates on a first side of the flexible substrate, an RF transmitter circuit electrically coupled to the first and second antenna patches and formed on a second side of the flexible substrate, a microcontroller circuit formed on the second side and electrically coupled to control the RF transmitter circuit to drive the first and second antenna patches to transmit a radio signal, and a battery for powering the RF transmitter circuit and the microcontroller circuit.

In another embodiment, a planar UWB patch antenna for receiving electrical power includes a non-electrically-conductive substrate, first and second antenna patches positioned on a first surface of the non-electrically-conductive substrate and having a geometry to transmit an UWB wireless signal, a first decoupling circuit directly electrically connected to the first antenna patch and having a decoupling frequency that is different from a transmitting frequency of the UWB wireless signal, and a second decoupling circuit directly electrically connected to the second antenna patch and having the same decoupling frequency as the first decoupling circuit. The first and second decoupling circuits transfer power from the first and second antenna patches when the first and second antenna patches receive capacitive power from an external non-electrical contact charger operating at the decoupling frequency and having two metal plates of similar geometry to the first and second antenna patches and that are positioned proximate and aligned with the first and second antenna patches.

In another embodiment, a charging device for a flexible planar RF tag that has a rechargeable battery and two antenna patches includes a dielectric layer, first and second metal plates formed on the dielectric layer and having geometry corresponding to geometry of the two antenna patches, a variable oscillator, a first inductor electrically coupled to the first metal plate and a first output of the variable oscillator, a second inductor electrically coupled to the second metal plate and a second output of the variable oscillator, and a microcontroller electrically coupled to the variable oscillator. When positioned such that the first and second metal plates are adjacent and aligned with the two antenna patches with the dielectric layer therebetween, the microcontroller is configured to control the variable oscillator to drive the first and second metal plates and transfer power to the flexible planar RF tag.

DETAILED DESCRIPTION OF THE EMBODIMENTS

Figure 1:
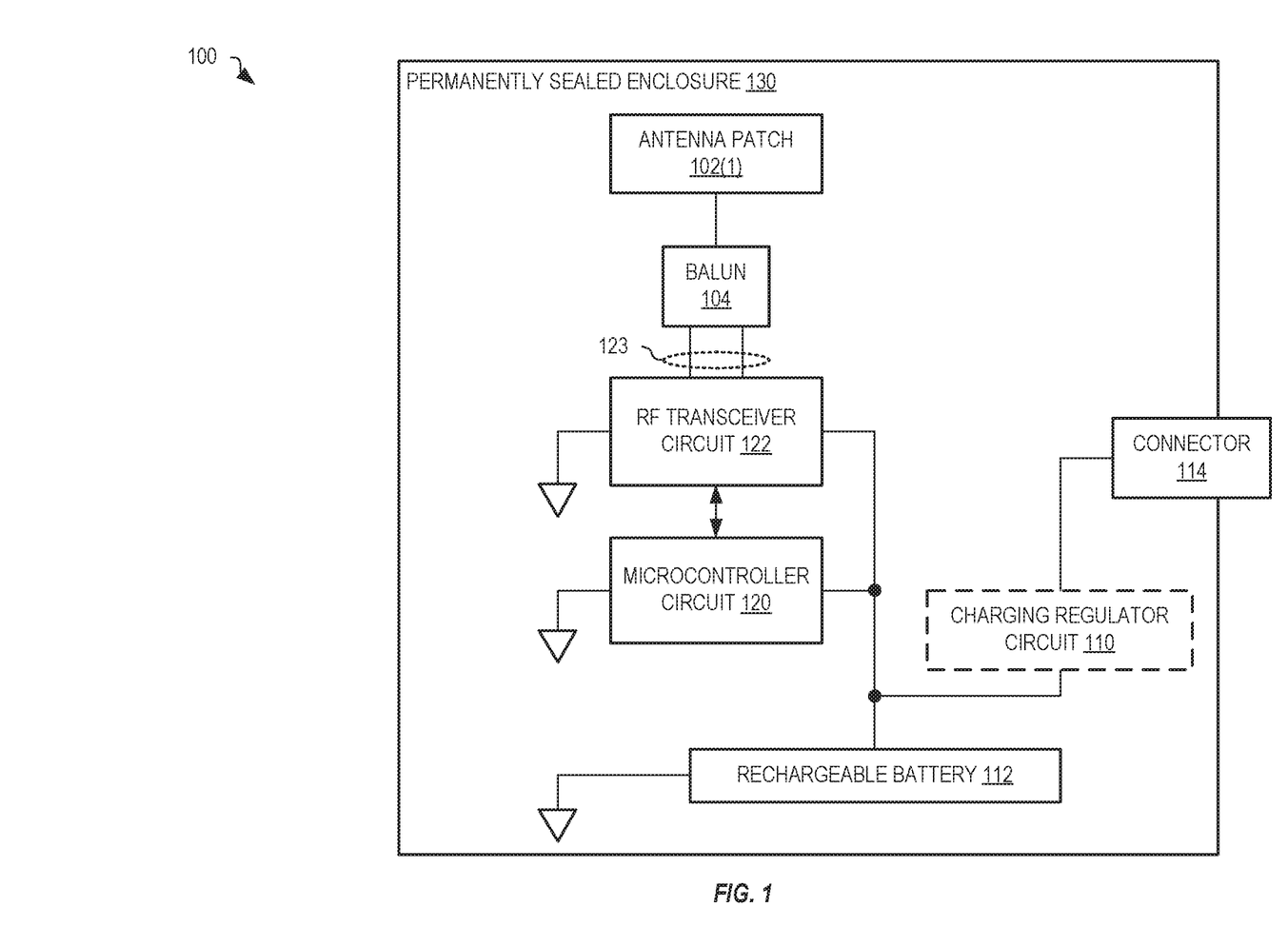
FIG. 1 is a schematic illustrating one exemplary planar flexible RF tag, in an embodiment.

FIG. 1 is a schematic illustrating one exemplary planar flexible RF tag 100 for use with a real-time location system. Planar flexible RF tag 100 includes one antenna patch 102 that electrically connects to a balun 104 that in turn electrically connects to a differential output 123 of an RF transceiver circuit 122. A rechargeable battery 112 provides power to RF transceiver circuit 122 and to a microcontroller circuit 120. In one embodiment, RF transceiver circuit 122 may be implemented as only a transmitter. Microcontroller circuit 120 controls RF transceiver circuit 122 via one or more electrical connections. Planar flexible RF tag 100 includes a connector 114 for charging rechargeable battery 112, and may further include a charging regulator circuit 110 to regulate electrical power received from connector 114 to charge rechargeable battery 112.

In one embodiment, electrical power is regulated prior to connector 114, wherein charging regulator circuit 110 is omitted. Antenna patch 102, rechargeable battery 112, microcontroller circuit 120, RF transceiver circuit 122 and charging regulator circuit 110 may be enclosed within a permanently sealed enclosure 130 that is waterproof, wherein connector 114 is configured with enclosure 130 to allow charging of rechargeable battery 112 without opening of enclosure 130. For example, connector 114 may be a waterproof type electrical connector that is permanently sealed within an orifice of enclosure 130, such that enclosure 130 is waterproof irrespective of whether connector 114 is in use. In another embodiment, connector 114 is external to enclosure 130, which is sealed around the electrical connections running between connector 114 and charging regulator circuit 110 and/or rechargeable battery 112. In one embodiment, charging regulator circuit 110 and connector 114 are omitted and rechargeable battery 112 is replaced with a one-time use, long life, flexible battery.

Figure 2:
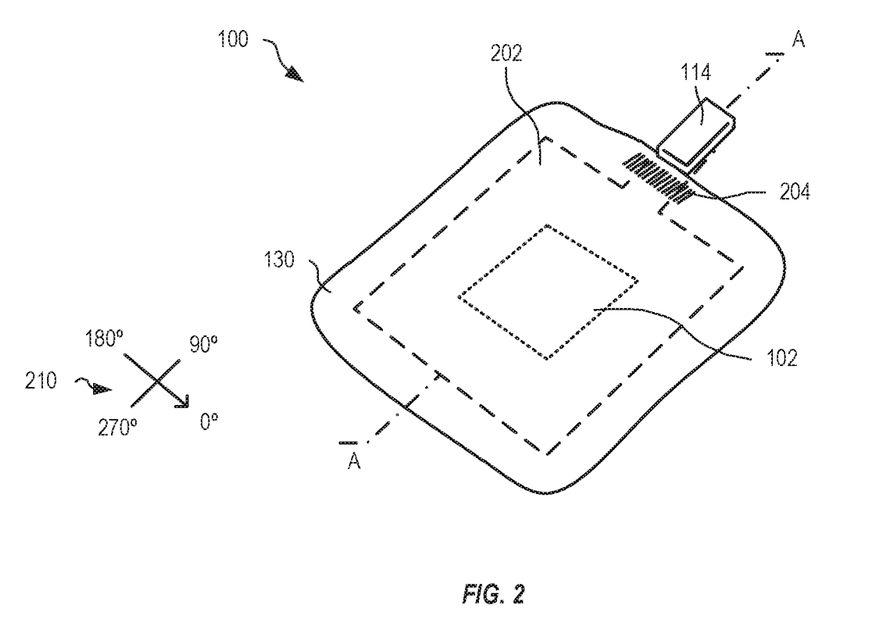
FIG. 2 is a perspective view of the planar flexible RF tag of FIG. 1, in an embodiment.

FIG. 2 is a perspective view of the planar flexible RF tag 100 of FIG. 1, in an embodiment. Planar flexible RF tag 100 is shown within a permanently sealed enclosure 130 that is for example a permanently sealed, thin flexible plastic packaging that allows for inclusion of planar flexible RF tag 100 into pockets of, and/or sewn into, clothing, uniform fabric, and other attire of the individual. For example, enclosure 130 may include provision for attachment such as areas for sewing, loops, button holes, and the like. The sealed nature of enclosure 130 allows for operation of planar flexible RF tag 100 in wet or dirty conditions as well as being amenable to washing. For example, additional sealing 204 may be used proximate and/or around connector 114 to prevent ingress of moisture. Antenna patch 102 and electrical components of planar flexible RF tag 100 are positioned on a flexible substrate 202 that is contained by enclosure 130, such that planar flexible RF tag 100 is pliable. In one embodiment, antenna patch 102 is formed of conductive metal positioned on one side of flexible substrate 202, which is non-electrically-conductive, and antenna patch 102 has geometry defining transmission of a wireless UWB signal. The geometry of antenna patch 102 is selected to transmit the wireless UWB signal with a propagation pattern suitable for use in a real-time location system. Although shown as rectangular, the geometry of antenna patch 102 is selected to obtain the desired propagation pattern and transmit at a desired frequency. FIG. 2 also shows an orientation reference 210 that is relative to the physical embodiment of planar flexible RF tag 100. However, planar flexible RF tag 100 may have no orientation restrictions when geometry of antenna patch 102 is symmetrical (e.g., square).

Figure 3:
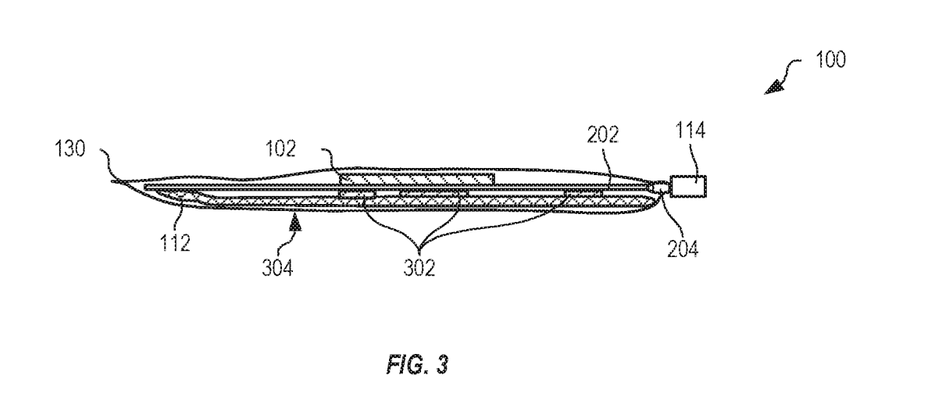
FIG. 3 shows a cross section A-A of the planar flexible RF tag of FIGS. 1 and 2, in an embodiment.

FIG. 3 shows a cross section A-A of the planar flexible RF tag 100 of FIGS. 1 and 2, in an embodiment. Antenna patch 102 is positioned on a first side of a flexible substrate 202, and electrical components 302 including balun 104, charging regulator circuit 110 (if included), microcontroller circuit 120, and RF transceiver circuit 122, and rechargeable battery 112 are positioned on a second side, opposite the first side, of flexible substrate 202 as shown. Rechargeable battery 112 is flat and flexible. In one embodiment, rechargeable battery 112 is a thin flexible rechargeable lithium polymer battery from BrightVolt Inc. Flexible substrate 202, antenna patch 102, components 302, and rechargeable battery 112 are all contained within enclosure 130. Planar flexible RF tag 100 is thus thin and flexible in format allowing it to be used in place of conventional RF tags and further where the hard-potted enclosure of conventional RF tags prohibit their use.

Figure 4:
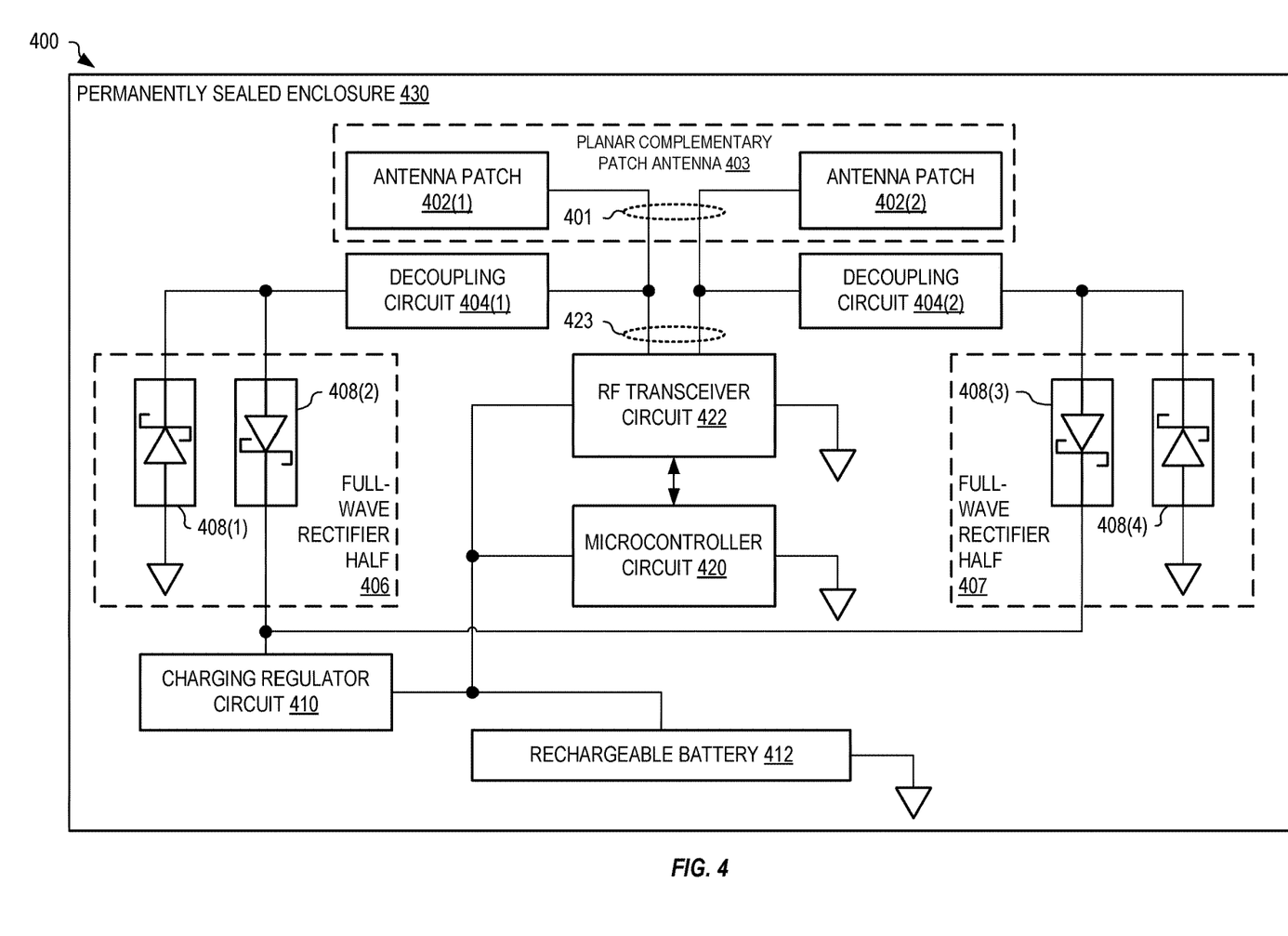
FIG. 4 is a schematic illustrating one example planar flexible RF tag, in embodiments.

FIG. 4 is a schematic illustrating one exemplary planar flexible RF tag 400. Planar flexible RF tag 400 includes two antenna patches 402(1), (2), each electrically connected to its own decoupling circuit 404(1), (2) that in turn electrically connects to its own full wave rectifier half 406 and 407, respectively. Antenna patches 402(1) and 402(2) cooperate to form a planar complementary patch antenna 403 that has a differential input 401. Full wave rectifier halves 406 and 407 each include two Schottky diodes 408(1)-(4) that are configured as shown in FIG. 4 to form a full wave rectifier having an output that electrically connects to a charging regulator circuit 410. Output from charging regulator circuit 410 electrically connects with a rechargeable battery 412. Rechargeable battery 412 provides power to a microcontroller circuit 420 and an RF transceiver circuit 422. In one embodiment, RF transceiver circuit 422 may implement only the transmitter. RF transceiver circuit 422 has a differential output 423 that has two balanced outputs that each connect to a different input of differential input 401 of planar complementary patch antenna 403. That is, outputs of RF transceiver circuit 422 each independently electrically connect to a different one of antenna patches 402(1) and 402(2). Microcontroller circuit 420 controls RF transceiver circuit 422 via one or more electrical connections. Antenna patches 402, decoupling circuits 404, full wave rectifier halves 406, 407, charging regulator circuit 410, rechargeable battery 412, microcontroller circuit 420 and RF transceiver circuit 422 may be enclosed within a permanently sealed enclosure 430 that is waterproof.

Figure 5:
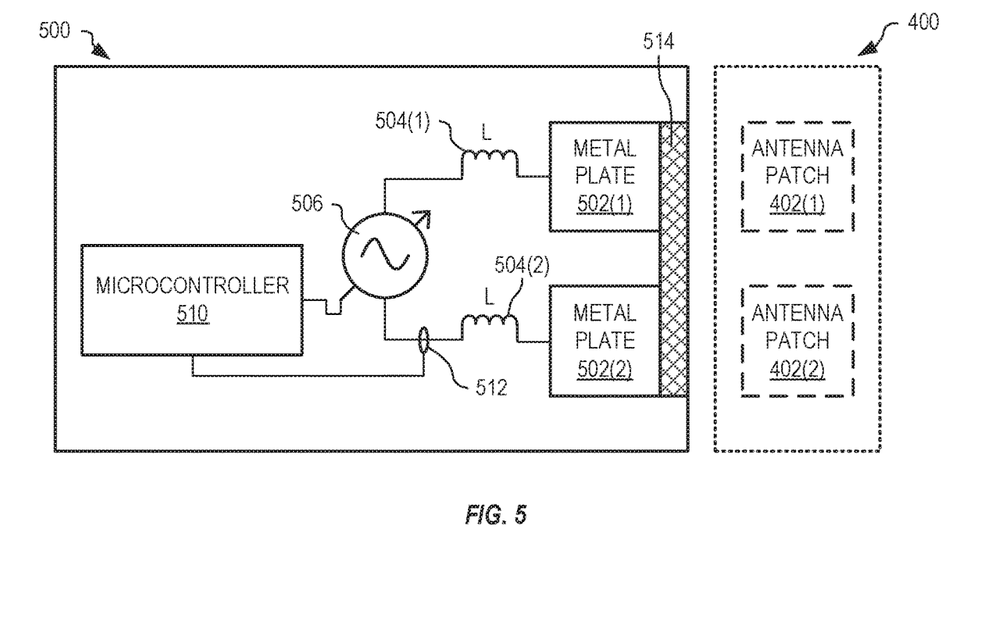
FIG. 5 is a schematic illustrating one example charging device for charging the rechargeable battery of the planar flexible RF tag of FIG. 4, in an embodiment.

FIG. 5 is a schematic illustrating one example charging device 500 for charging rechargeable battery 412 of planar flexible RF tag 400 of FIG. 4. Charging device 500 includes two metal charging plates 502(1) and 502(2) that are each electrically coupled to a different output of a variable oscillator 506 via one of two inductors 504(1) and 504(2). Metal charging plates 502 are each of a similar size and shape to a corresponding one of antenna patches 402(1) and 402(2). A frequency of variable oscillator 506 is controlled by a microcontroller 510 based upon a current through inductor 504(2) that is sensed by a current sensor 512. Since metal charging plates 502 and planar complementary patch antenna 403 are balanced, current through inductor 504(1) is assumed to be similar to current through inductor 504(2) and therefore is not measured. Variable oscillator 506 operates at a frequency (e.g., in an unlicensed ISM band—13.53 MHz) that is much lower than the RF operating frequency of antenna patches 402. Metal charging plates 502 are sized and positioned on a dielectric substrate 514.

Charging device 500 operates as an external non-electrical contact charger for charging rechargeable battery 412 of planar flexible RF tag 400. In one embodiment, metal charging plates 502 have identical geometry to antenna patches 402 and are printed onto dielectric substrate 514 which functions to separate metal charging plates 502 from antenna patches 402 during charging. Charging device 500 has a flat side which is placed in very close proximity and in registration to antenna patches 402 to form a set of two "effective" capacitors. The capacitors couple the low frequency RF currents (herein also referred to as capacitive power) from the charging device 500 to antenna patches 402 within planar flexible RF tag 400. Circuitry of charging device 500 includes a matching set of inductors in series with the effective capacitors formed by metal charging plates 502, dielectric substrate 514, and antenna patches 402. The value of these inductors is calculated to be resonant with the effective capacitors at the charging frequency to allow for maximum efficiency for transfer of the maximum power and thereby a lowest time to charge rechargeable battery 412 of planar flexible RF tag 400. Microcontroller 510 within charging device 500 uses current sensor 512 to sense the AC RF current draw and adjusts, under closed loop control, the RF frequency of variable oscillator 506 to the exact resonance frequency for the effective capacitors.

Figure 6:
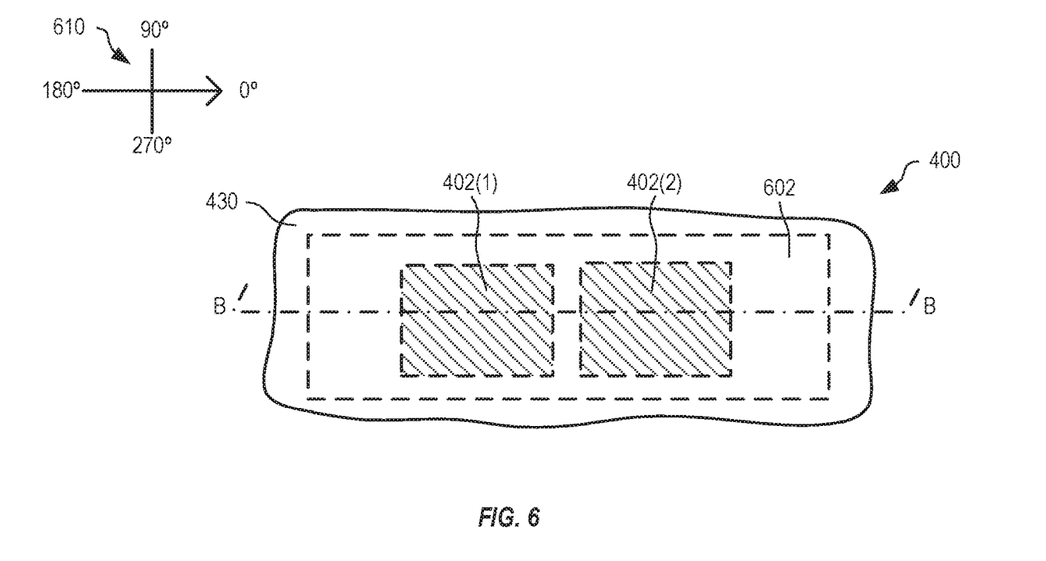
FIG. 6 is a top view of the planar flexible RF tag of FIG. 4, in an embodiment.

FIG. 6 is a top view of the planar flexible RF tag 400 of FIG. 4, in an embodiment. Planar flexible RF tag 400 is shown within a permanently sealed enclosure 430 that is for example a permanently sealed, thin flexible plastic packaging that allows for inclusion of planar flexible RF tag 400 into pockets of, and/or sewn into, clothing, uniform fabric, and other attire of the individual. For example, enclosure 430 may include provision for attachment such as areas for sewing, loops, button holes, and the like. The sealed nature of enclosure 430 allows for operation of planar flexible RF tag 400 in wet or dirty conditions as well as being amenable to washing. Components of planar flexible RF tag 400 are positioned on a flexible substrate 602 that is contained by enclosure 430, such that planar flexible RF tag 400 is pliable. In one embodiment, antenna patches 402 are formed of conductive metal positioned on one side of flexible substrate 602, which is non-electrically-conductive, and antenna patches 402 have geometry defining transmission of a wireless UWB signal. The geometry of antenna patches 402 is selected to generate the wireless UWB signal with a propagation pattern (e.g., see FIG. 9) sufficient for use in a real-time location system. Although shown as rectangular, the geometry of antenna patches 402 is selected to obtain the desired propagation pattern and for operation at a desired transmission frequency. FIG. 6 also shows an orientation reference 610 that is relative to the physical embodiment of planar flexible RF tag 400.

Figure 7:
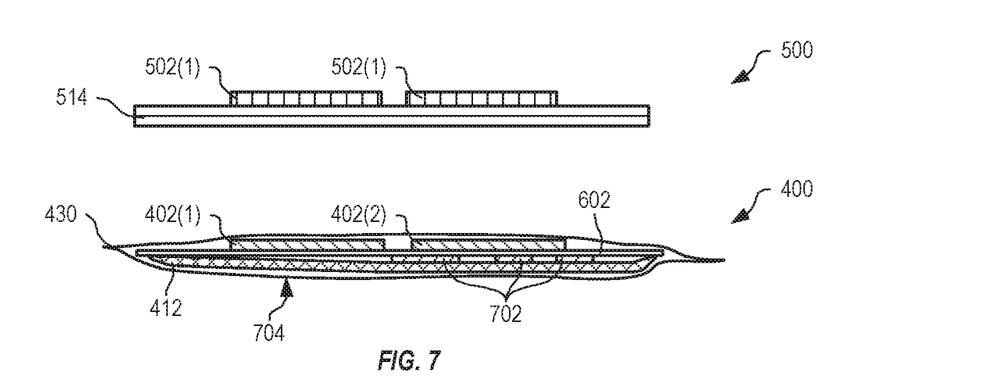
FIG. 7 shows a cross section B-B of the planar flexible RF tag of FIGS. 4 and 6 and a cross section of the charging device of FIG. 5, in embodiment.

FIG. 7 shows a cross section B-B of the planar flexible RF tag 400 of FIG. 6 and a cross section of the charging device 500 of FIG. 5, in embodiment. As shown for charging device 500, metal charging plates 502 are positioned on dielectric substrate 514, which is for example a circuit board, such that metal charging plates 502 align with antenna patches 402 of planar flexible RF tag 400.

For planar flexible RF tag 400, antenna patches 402 are positioned on a first side of flexible substrate 602, and components 702 of decoupling circuits 404, full wave rectifier halves 406, 407, charging regulator circuit 410, microcontroller circuit 420, and RF transceiver circuit 422, and rechargeable battery 412 are positioned on a second side, opposite the first side, of flexible substrate 602 as shown. Rechargeable battery 412 is flat and flexible. In one embodiment, rechargeable battery 412 is a thin flexible rechargeable lithium polymer battery from BrightVolt Inc. Flexible substrate 602, antenna patches 402, components 702, and rechargeable battery 412 are all contained within enclosure 430. Planar flexible RF tag 400 is thus thin and flexible in format allowing it to be used where the hard-potted enclosure of conventional RF tags prohibit use.

Figure 8:
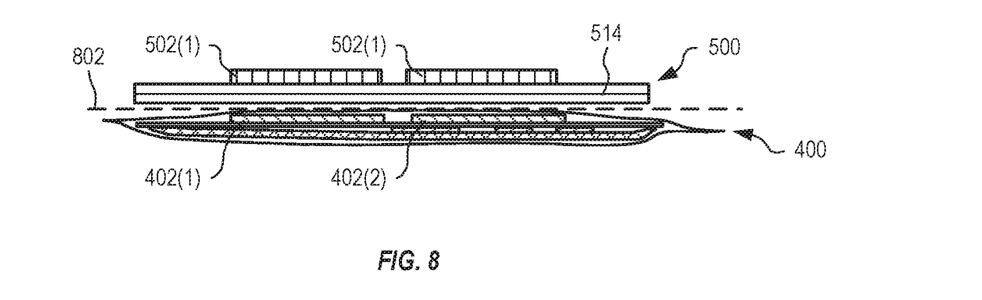
FIG. 8 shows, in cross section, the charging device of FIGS. 5 and 7 positioned to charge the rechargeable battery of the planar flexible RF tag of FIGS. 4, 6 and 7, in embodiments.

FIG. 8 shows, in cross section, the charging device of FIGS. 5 and 7 positioned to charge rechargeable battery 412 of planar flexible RF tag 400 of FIGS. 4, 6, and 7. Charging device 500 is positioned over planar flexible RF tag 400 such that metal charging plates 502 are aligned with antenna patches 402. Where planar flexible RF tag 400 is sewn into clothing, fabric 802 of that clothing may be between charging device 500 and planar flexible RF tag 400. However, the fabric does not prevent charging device 500 from charging rechargeable battery 412 of planar flexible RF tag 400 since no direct electrical contact is required.

Figure 9:
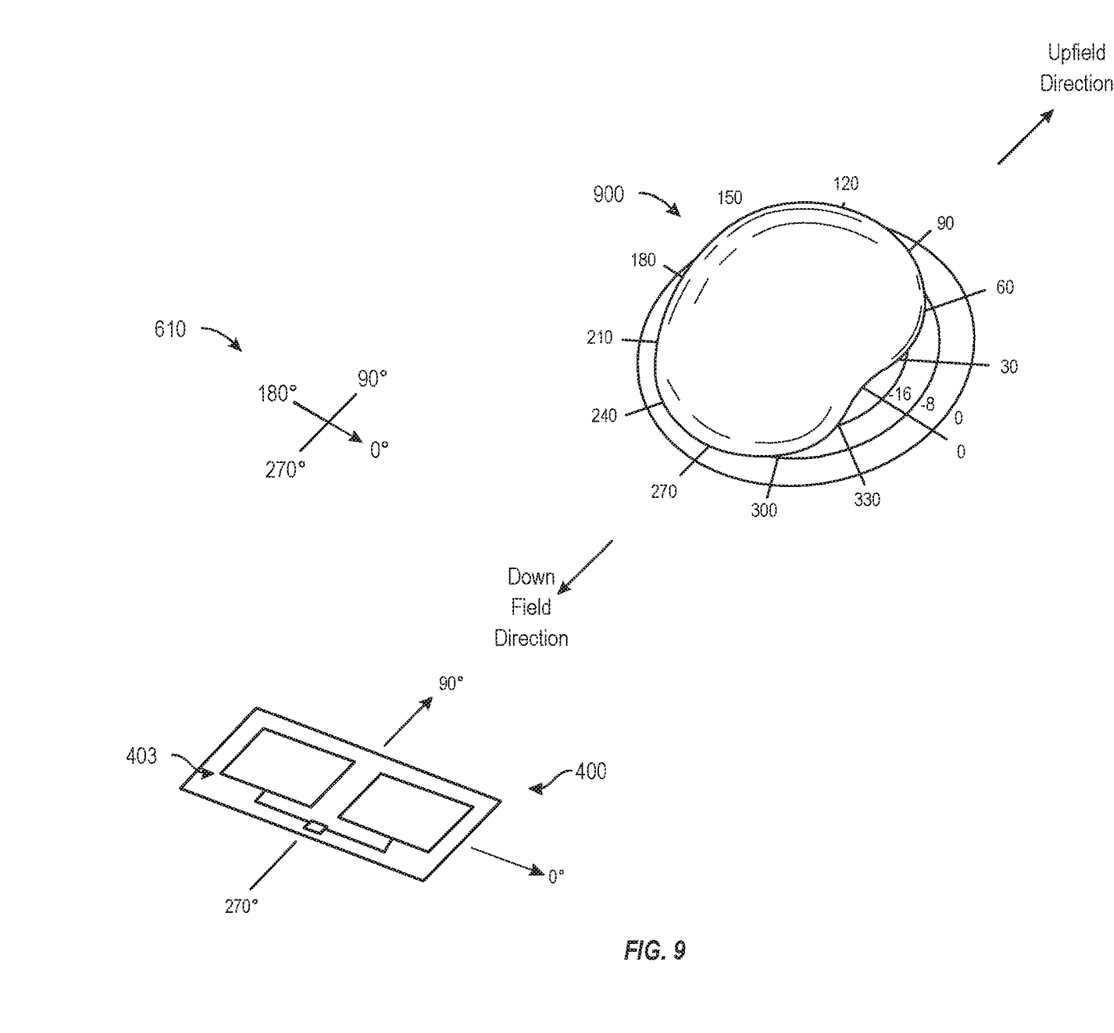
FIG. 9 shows a propagation pattern for the planar complementary antenna patches of FIG. 4, in embodiments.

FIG. 9 shows a propagation pattern 900 for the planar flexible RF tag 400 of FIGS. 4, and 6-8, in embodiments. Orientation of propagation pattern 900 is shown relative to orientation reference 610 of planar flexible RF tag 400. Propagation pattern 900 is suitable for tracking an individual using a real-time location system.

Figure 10:
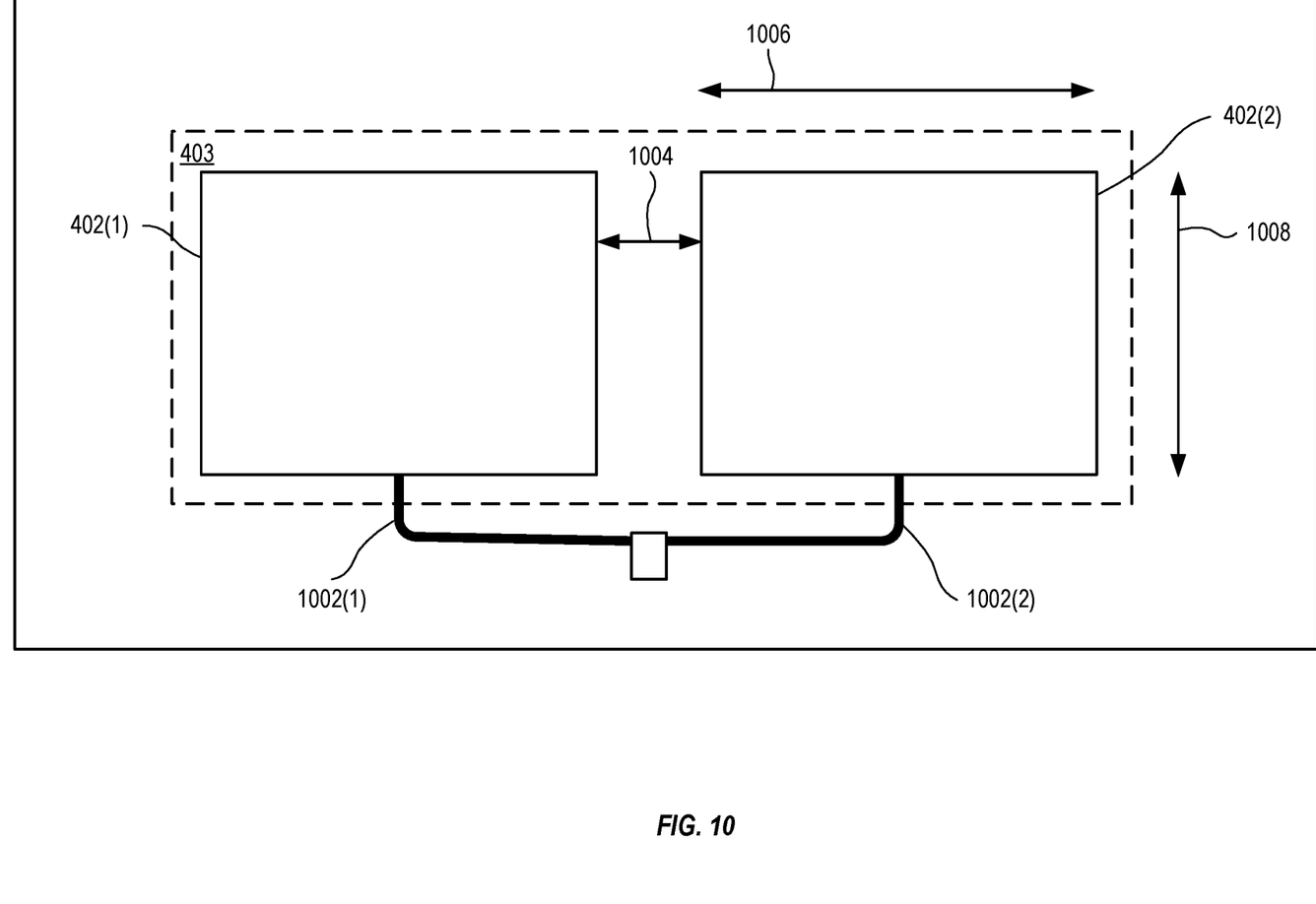
FIG. 10 is an image showing exemplary layout of the planar complementary antenna patches of FIG. 4, in one embodiment.

FIG. 10 is an image showing exemplary layout of the planar complementary patch antenna 403 of FIG. 4, in one embodiment. In this embodiment, antenna patches 402 are each substantially rectangular, equally sized, and aligned along one edge with spacing 1004 between them. Planar complementary patch antenna 403 also include two feed elements 1002(1) and (2) that electrically connect a different one of antenna patches 402 to decoupling circuits 404 (not shown in FIG. 10) and RF transceiver circuit 422 (not shown in FIG. 10). In one embodiment, the geometry (e.g., width 1006 and length 1008, spacing 1004 and substantially rectangular shape) of antenna patches 402 is configured such that planar complementary patch antenna 403 is resonant at 6.5 GHz and obtains propagation pattern 900. Manipulating the geometry of the antenna elements (i.e., antenna patches 402) of planar complementary patch antenna 403 predictably alters shape and range of propagation of radio waves transmitted therefrom. This facilitates design of planar flexible RF tag 400 for a particular use.

Figure 11:
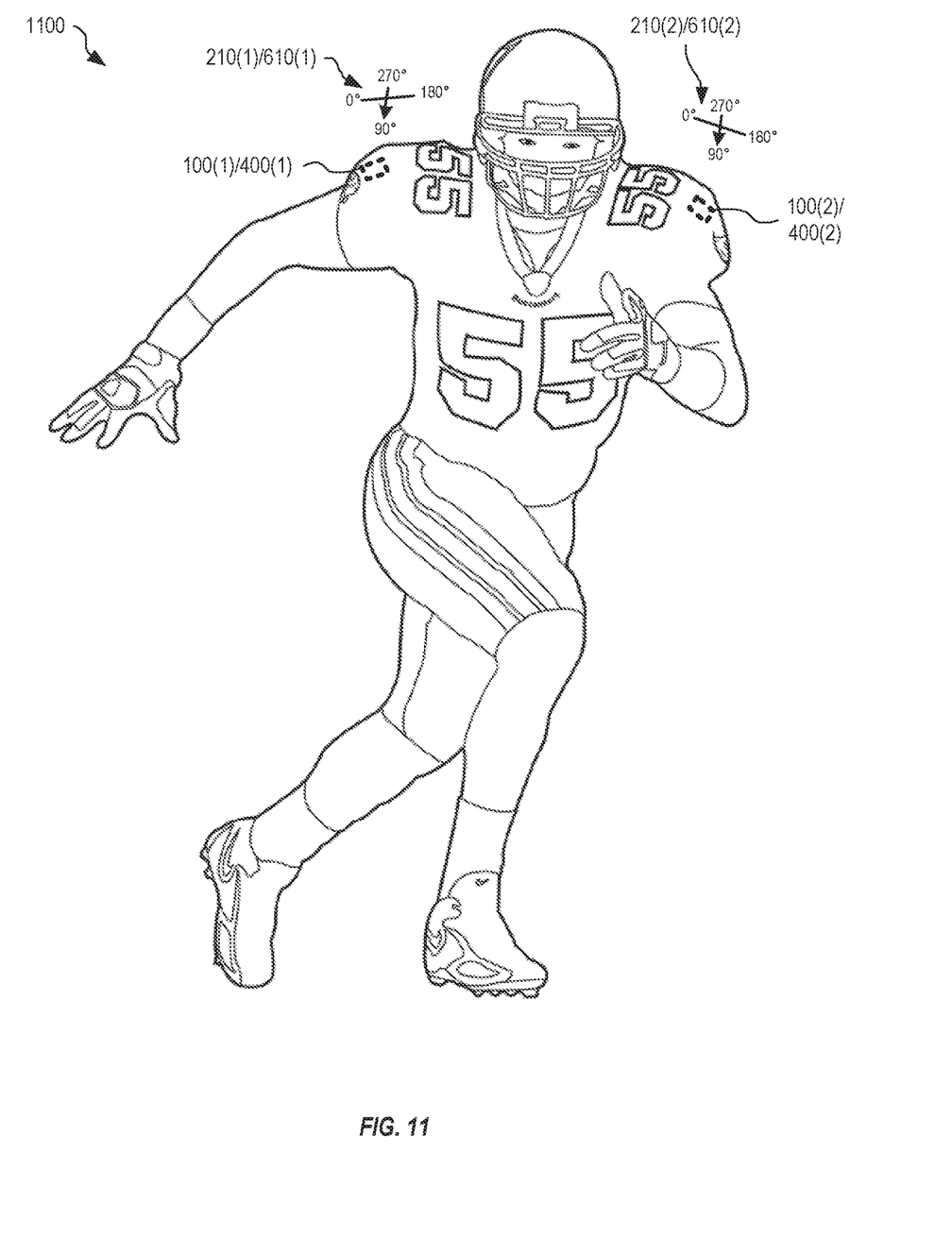
FIG. 11 shows exemplary positioning of two planar flexible RF tags of FIGS. 4, 6, and 7 on an American football player to illustrate exemplary orientation of the planar flexible RF tags relative to the player, in an embodiment.

FIG. 11 shows exemplary positioning of two planar flexible RF tags 100/400 of FIGS. 1-4, and 6-8, on an American football player 1100 to illustrate exemplary orientation of the planar flexible RF tags relative to the player, in an embodiment. Tags 100/400 may be configured with clothing and/or equipment of player 1100, as described above.

In particular, each planar flexible RF tag 100/400 is oriented (see orientation references 610(1) and (2)) such that transmission power in the forward and backward directions (relative to player 1100) is greater than the transmission power in the sideways directions. Thus, less of the transmitted energy is absorbed by the player's body, since less power is transmitted in that direction, as compared to a conventional UWB omnidirectional antenna.

Figure 12:
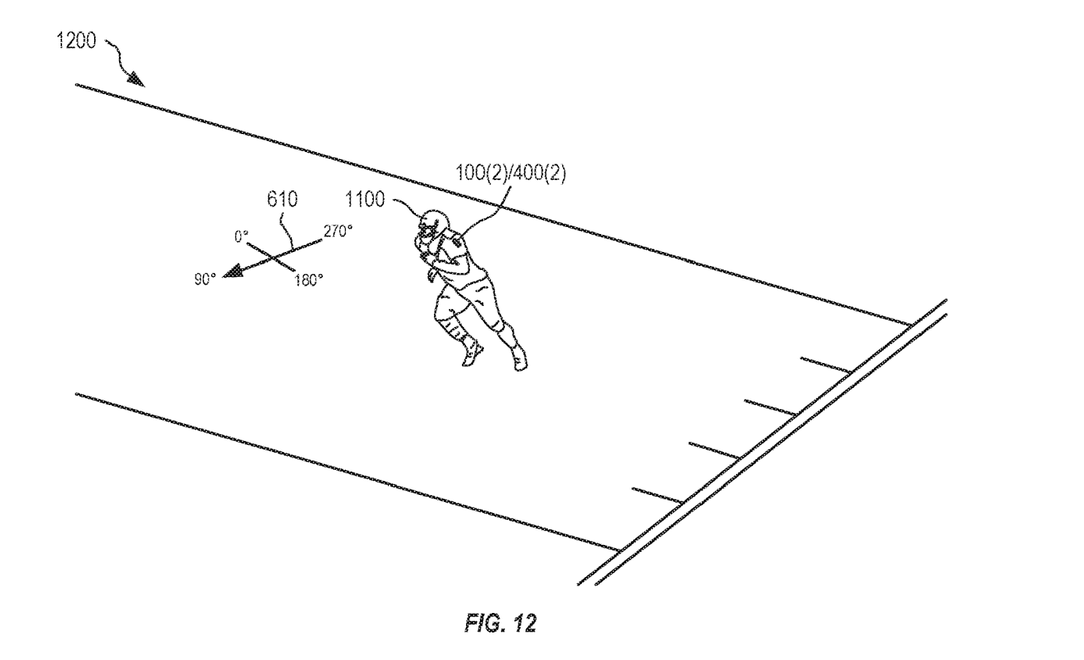
FIGS. 12 and 13 show the player of FIG. 11 on an American football field illustrating exemplary propagation of transmissions from the planar flexible RF tags configured with the player, in an embodiment.
Figure 13:
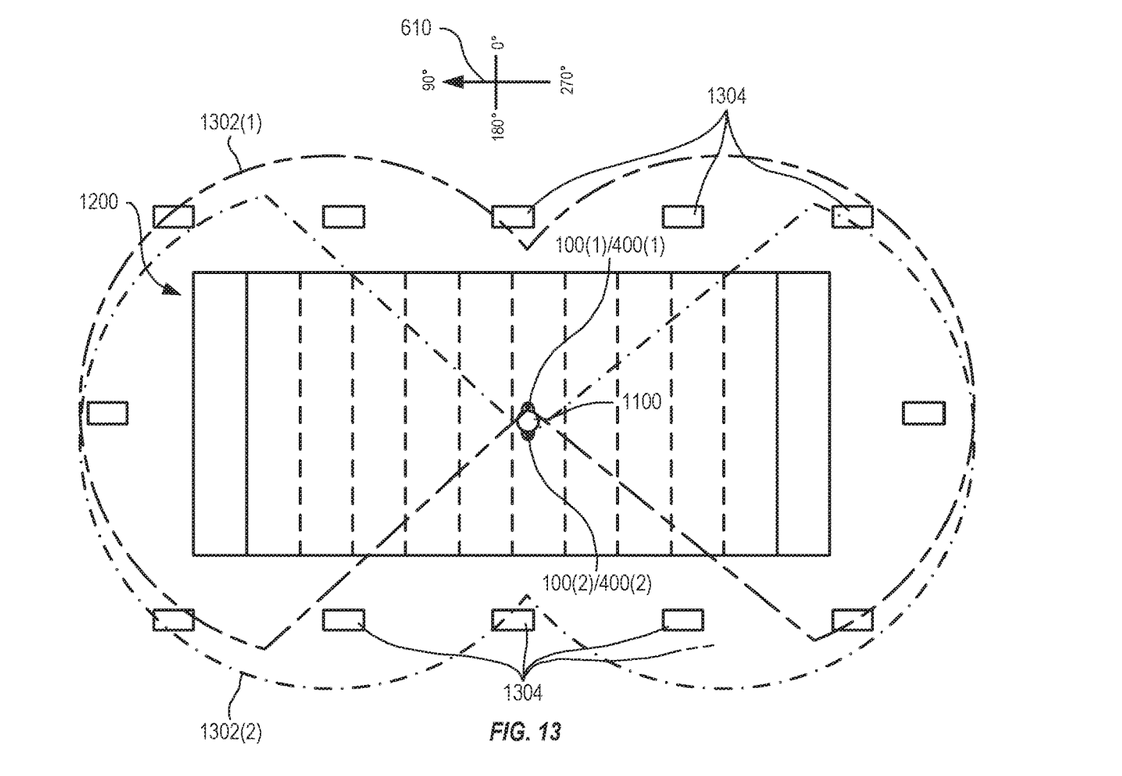

FIGS. 12 and 13 show player 1100 of FIG. 11 on an American football field 1200 illustrating exemplary propagation of transmissions 1302(1) and 1302(2) from planar flexible RF tags 100(1)/400(1) and 100(2)/400(2), respectively, of player 1100. Plays on the American football field are generally up or down the field 1200, as opposed to across the field. Thus, players in general are also facing up and down the length of the field. As shown, field 1200 is surrounded by a plurality of receivers 1304 (also known as anchors) that are configured to receive transmissions from planar flexible RF tags 100/400. The receiver locations and received transmissions are used to determine the location of the planar flexible RF tags 100/400 within the operational area that includes field 1200. At least three receivers 1304 are required to receive a particular transmission to enable location of the corresponding planar flexible RF tag 100/400.

Transmissions 1302 correspond to propagation pattern 900 (i.e., transmission power of tag 100/400) of FIG. 9, and also illustrate exemplary blockage by the body of player 1100. Positioning and orientation of planar flexible RF tags 100/400 (i.e., antenna patches 102/402) determines the shape of transmission 1302, and its effectiveness at being received by receivers 1304. By configuring antenna patches 102/402 such that more power is transmitted in the player's forward/backward direction (i.e., 90-270 degrees relative to the orientation reference 610 of the antenna, less power is absorbed by the player's body. Further, since field 1200 is longer than it is wide, more receivers 1304 receive each transmission 1302. The advantages of planar flexible RF tags 100/400 may be used to track other players and objects and used with other sports without departing from the scope hereof.

ADVANTAGES

Planar flexible RF tags 100/400 have at least three main advantages over prior art RF tags. First, antenna patches 402(1) and (2) have differential input 401 that may be driven in a balanced way (differential) allowing direct connection to a balanced drive input and output of RF transceiver circuit 422 without a balun (balanced-to-unbalanced converter). A conventional microstrip patch antenna has a ground plane and one (or more serial or parallel connected) patches that are driven single ended, thereby requiring the use of a balun device when using a transmitter with a balanced/differential input/output (which more transmitting devices are). By including two antennal patches 402 within planar complementary patch antenna 403, and directly connecting each of the antenna patches 402 to a different connector of the differential output 423 of RF transceiver circuit 422, the balun is not required. Although it is known to drive conventional dipole antennae in a balanced way, it is previously unknown to drive a pair of microstrip patch antennae in a complementary manner similar to driving the conventional dipole antennae. Further, since the balun device is not required and not included, its associated loss is also not incurred which improves transceiver performance and range.

Second, placement geometry (e.g., spacing 1004) of the two complementary driven antenna patches 402 is configured to allow the electromagnetic field interaction and propagation pattern 900 to be sufficient for tracking an individual using an UWB real-time location system. For example, planar flexible RF tag 400 of FIG. 4 may be configured to periodically transmit a radio signal that includes identification information, which is received by the UWB real-time location system, which in turn determines a location of the tag based upon triangulation. The propagation pattern (e.g., propagation pattern 900 of FIG. 9) in this example is biased transverse to the player's shoulder axis giving better gain in the down and up field directions and diminishing gain toward the players neck and sidelines.

Third, the complementary nature of antenna patches 402 and the fact that it is a conducting patch lends itself to a second application crucial to the overall design of planar flexible RF tag 400, which is the battery recharging function. Antenna patches 402 may be considered as simply metal plates. When another, complementary set of metal plates (e.g., metal charging plates 502 of charging device 500) and a suitable dielectric layer (e.g., dielectric substrate 514) is brought within close proximity of the antenna patches 402, as shown in FIG. 8, then at frequencies much lower than the microwave operating frequency of antenna patches 402, power is transferred from the metal plates to the antenna patches. For sufficient power transfer from the metal plates to the antenna patches, these metal plates match the geometry (e.g., size, shape, and spacing) of the antenna patches. With suitable decoupling (as provided by decoupling circuits 404), rectification (as provided by full wave rectifier halves 406, 407) and charge management circuits (as provide by charging regulator circuit 410), this power transfer may be used to charge rechargeable battery 412 without requiring electrical contact. Thus, enclosure 430 need not be breached or opened to recharge rechargeable battery 412.

Advantageously, the non-electrical contact battery recharging may be performed as needed without removal of planar flexible RF tag 400 from clothing. Alternatively, as with planar flexible RF tag 100, connector 114 is easily accessed to charge rechargeable battery 112.

Since planar flexible RF tag 100/400 is thin (not having 3D antenna or a thick battery), flexible (having components mounted on a flexible substrate and a flexible rechargeable battery) and light weight (the thin efficient operation does not require the use of a single-use higher powered battery), it is much less obtrusive and therefore more widely acceptable for use in tracking athletes and objects in hostile environments.

The thin profile of planar flexible RF tag 100/400 allows it to be placed unobtrusively on or in athletic equipment and on or in athletic clothing. In one embodiment, a lower surface 304/704 of planar flexible RF tag 100/400 has an adhesive coating that allows planar flexible RF tag 100/400 to adhere to a surface (e.g., sports equipment, helmet, clothing, skin of the athlete). In one embodiment, the adhesive is protected by a removable layer that allows planar flexible RF tag 100/400 to be applied using a technique similar to applying a Band-Aid. For example, planar flexible RF tag 100/400 may be attached to a bicycle to allow a real-time location system to track the movement of that bicycle and the rider. In another embodiment, planar flexible RF tag 100/400 is attached to a lanyard and/or worn like a pendant. Thereby, a golfer may wear planar flexible RF tag 100/400 around their neck for example.

In the configuration shown in FIG. 10, planar complementary patch antenna 403 generates propagation pattern 900 which is ideally suited for operation within planar flexible RF tag 400 to allow a real-time location system to track athletes performing within a stadium.

As shown in FIGS. 3, 7, and 8 rechargeable battery 112/412 is thin and flexible, thereby also allowing planar flexible RF tag 100/400 to be flexible. This alone is a considerable advance in technology for tracking athletes since planar flexible RF tag 100/400, by being flexible and thin, may thereby provide for easier, less obtrusive placement in athletic equipment and/or clothing.

Antenna patch 102 and planar complementary patch antenna 403 reduce the overall thickness of planar flexible RF tag 100/400 since the conventionally used 3D antenna design is not required. Further, antenna patch 102 and planar complementary patch antenna 403 have reduced fragility since there is no 3D structure mounted away from the supporting substrate that requires protection.

Since antenna patch 102 and planar complementary patch antenna 403 are substantially flat, less protection (as compared to a more delicate 3D structure) is required and they may even be deformed (flexed) without significant loss in performance (e.g., deviation from propagation pattern 900 of FIG. 9). Thus, unlike prior art RF tags, planar flexible RF tag 100/400 may utilize flexible substrate 202/602 to support each of antenna patch 102 and planar complementary patch antenna 403, components 302/702, and rechargeable battery 112/412. This flexibility significantly advances the art of RF tracking systems where prior art UWB RF tags were built using rigid circuit boards and required hard, thick housings. In the prior art, these rigid PCBs were required to support and protect the 3D antenna, and to support the larger, heavier and non-flexibly battery.

Historically, UWB tags were designed from discrete components that were interconnected by etched tracked on a printed circuit board. At UWB frequencies absolutely everything, including the etches, affects the performance of the circuit. For this reason, etches need to be considered components of the UWB and so having them flexing, stretching and contracting wreaks havoc with circuit performance. Within planar flexible RF tag 100/400, UWB components and connectivity may be implemented within an integrated circuit that attaches to flexible substrate 202/602. Thus, UWB circuitry itself is not susceptible to bending within planar flexible RF tag 100/400.

Since planar flexible RF tag 100/400 is flexible, when incorporated within athletic equipment, configured within clothing, or attaches directly to an athlete, inevitable bending of planar flexible RF tag 100/400 is accommodated through the flexibility rather than resulting in breakage. Thus, planar flexible RF tag 100/400 is less fragile that prior art RF tags. Thus, this flexibility also makes planar flexible RF tag 100/400 more adaptable to the environment, the athlete, the clothing, and/or the equipment upon which they are mounted on or in.

Although the embodiments described above and shown in the figures have one or two antenna patches, further embodiments are envisioned where multiple antenna patches are coupled together in one or both of serial and parallel configurations.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween. In particular, the following embodiments are specifically contemplated, as well as any combinations of such embodiments that are compatible with one another:

(A) A planar flexible ultra-wide band (UWB) RF antenna includes a flexible non-electrically-conductive substrate, and an antenna patch comprising electrically conductive metal positioned on one side of the flexible non-electrically-conductive substrate and having geometry defining a wirelessly transmitted UWB signal.

(B) In the planar flexible UWB RF antenna denoted as (A), the UWB signal having a propagation pattern suitable for use in a real-time location system.

(C) Either of the planar flexible UWB RF antennae denoted as (A) and (B), further including a feed element electrically coupled to the antenna patch and electronic components of a planar flexible RF tag configured with an object being tracked by the real-time location system.

(D) In any of the planar flexible UWB RF antennae denoted as (A)-(C), the geometry including a size and shape to wirelessly transmit the UWB signal with a propagation pattern suitable for use in a real-time location system.

(E) In any of the planar flexible UWB RF antennae denoted as (A)-(D), the shape including a rectangle.

(F) A planar complementary patch antenna includes a flexible non-electrically-conductive substrate, first and second antenna patches positioned apart from each other on one side of the flexible non-electrically-conductive substrate, and a differential input having (a) a first feed element electrically coupled directly to only the first antenna patch and (b) a second feed element electrically coupled directly to only the second antenna patch, the differential input being drivable from a differential output of an RF transmitter circuit to generate a wireless signal from the complementary patch antenna.

(G) In the planar complementary patch antenna denoted as (F), the first and second antenna patches transmitting the wireless signal at transmission frequency and propagation pattern defined by geometry of the first and second antenna patches.

(H) In either of the planar complementary patch antennae denoted as (F) and (G), the geometry defining size and shape of, and spacing between, the first and second antenna patches to transmit the wireless signal for use with an ultra-wide band real-time location system.

(I) In any of the planar complementary patch antennae denoted as (F)-(H), the shape of each of the first and second antenna patches being substantially rectangular.

(J) A dual-purpose antenna includes a first electrically conductive metal antenna element and a second electrically conductive metal antenna element configured such that the dual-purpose antenna transmits a wireless signal at transmission frequency and propagation pattern defined by geometry of the first and second antenna elements, and the dual-purpose antenna receives, without electrical contact, capacitive power across two different capacitors each formed in part by a different one of the first and second antenna elements.

(K) In the dual-purpose antenna denoted as (J), the geometry defining size and shape of, and spacing between, the first and second electrically conductive metal antenna elements to transmit the wireless signal for use with an ultra-wide band real-time location system.

(L) In either of the dual-purpose antennae denoted as (J) and (K), the first and second electrically conductive metal antenna elements being formed on a first surface of a non-electrically-conductive flexible substrate.

(M) Any of the dual-purpose antennae denoted as (J)-(L), further including a first decoupling circuit electrically coupled to the first electrically conductive metal antenna element and operable to decouple the capacitive power at a first frequency less than the transmission frequency, and a second decoupling circuit electrically coupled to the second electrically conductive metal antenna element and operable to decouple the capacitive power at the first frequency.

(N) Any of the dual-purpose antennae denoted as (J)-(M), further including a first full wave rectifier half electrically coupled to the first decoupling circuit, a second full wave rectifier half electrically coupled to the second decoupling circuit, and a regulator circuit electrically coupled to both the first and second full wave rectifier halves to condition rectified electrical power from the first and second full wave rectifier halves.

(O) A planar flexible RF tag for use in a real-time location system includes a flexible substrate, at least one antenna patch formed on a first side of the flexible substrate, an RF transmitter circuit electrically coupled to the at least one antenna patch and formed on a second side of the flexible substrate, and a microcontroller circuit formed on the second side and electrically coupled to control the RF transmitter circuit to drive the at least one antenna patch to transmit a radio signal.

(P) The planar flexible RF tag denoted as (O), further including a rechargeable battery for powering the RF transmitter circuit and the microcontroller circuit.

(Q) Either of the planar flexible RF tags denoted as (O) and (P), further including a flexible waterproof enclosure that encapsulates the at least one antenna patch, the RF transmitter circuit, and the microcontroller circuit.

(R) Any of the planar flexible RF tags denoted as (O)-(Q), further including an electrical connector positioned at least partially outside the flexible waterproof enclosure for providing electrical power to recharge the rechargeable battery.

(S) Any of the planar flexible RF tags denoted as (O)-(R), further including a regulator circuit formed on the second side of the flexible substrate, positioned within the flexible waterproof enclosure, and electrically connected to the electrical connector and the rechargeable battery, the regulator circuit regulating charge of the rechargeable battery.

(T) In any of the planar flexible RF tags denoted as (O)-(S), the at least one antenna patch having geometry to transmit the radio signal using ultra-wide band technology.

(U) In any of the planar flexible RF tags denoted as (O)-(T), the geometry defining size, shape and spacing of the at least one antenna patch.

(V) In any of the planar flexible RF tags denoted as (O)-(U), the shape being substantially rectangular.

(W) A planar flexible RF tag for use in a real-time location system includes a flexible substrate, first and second antenna patches formed as complementary plates on a first side of the flexible substrate, an RF transmitter circuit electrically coupled to the first and second antenna patches and formed on a second side of the flexible substrate, a microcontroller circuit formed on the second side and electrically coupled to control the RF transmitter circuit to drive the first and second antenna patches to transmit a radio signal, and a battery for powering the RF transmitter circuit and the microcontroller circuit.

(X) The planar flexible RF tag denoted as (W), further including a first decoupling circuit formed on the second side of the flexible substrate and electrically coupled with one of the first and second antenna patches, a second decoupling circuit formed on the second side of the flexible substrate and electrically coupled to a different one of the first and second antenna patches, a first full wave rectifier half formed on the second side of the flexible substrate and electrically coupled to the first decoupling circuit, a second full wave rectifier half formed on the second side of the flexible substrate and electrically coupled to the second decoupling circuit, and a charging regulator circuit formed on the second side of the flexible substrate and electrically coupled to both the first and second full wave rectifier halves to receive power via the first and second antenna patches from a charging device that does not have a direct electrical connection to the planar flexible RF tag.

(Y) Either of the planar flexible RF tags denoted as (W) and (X), further including a waterproof and permanently sealed enclosure.

(Z) Any of the planar flexible RF tags denoted as (W)-(Y), further including provision for attachment of the planar flexible RF tag to one or both of clothing and equipment of an individual to allow tracking of the individual.

(AA) In any of the planar flexible RF tags denoted as (W)-(Z), the waterproof and permanently sealed enclosure being flexible.

(AB) Any of the planar flexible RF tags denoted as (W)-(AA), further including an adhesive formed on an underside of the waterproof and permanently sealed enclosure to adhere the planar flexible RF tag to a surface of an object to be tracked.

(AC) In any of the planar flexible RF tags denoted as (W)-(AB), the battery being flexible and allowing the planar flexible RF tag to bend without damage or loss of performance.

(AD) A planar ultra-wide band (UWB) patch antenna for receiving electrical power includes a non-electrically-conductive substrate, first and second antenna patches positioned on a first surface of the non-electrically-conductive substrate and having a geometry to transmit an UWB wireless signal, a first decoupling circuit directly electrically connected to the first antenna patch and having a decoupling frequency that is different from a transmitting frequency of the UWB wireless signal, and a second decoupling circuit directly electrically connected to the second antenna patch and having the same decoupling frequency as the first decoupling circuit. The first and second decoupling circuits transferring power from the first and second antenna patches when the first and second antenna patches receive capacitive power from an external non-electrical contact charger operating at the decoupling frequency and having two metal plates of similar geometry to the first and second antenna patches and that are positioned proximate and aligned with the first and second antenna patches.

(AE) In the planar ultra-wide band (UWB) patch antenna denoted as (AD), the geometry defining size, shape and spacing of the first and second antenna patches to transmit the UWB wireless signal with a propagation pattern suitable for use in an UWB real-time location system.

(AF) A charging device for a flexible planar RF tag that has a rechargeable battery and two antenna patches, the charging device includes a dielectric layer, a first and second metal plates formed on the dielectric layer and having geometry corresponding to geometry of the two antenna patches, a variable oscillator, a first inductor electrically coupled to the first metal plate and a first output of the variable oscillator, a second inductor electrically coupled to the second metal plate and a second output of the variable oscillator, and a microcontroller electrically coupled to the variable oscillator. When positioned such that the first and second metal plates are adjacent and aligned with the two antenna patches with the dielectric layer therebetween, the microcontroller is configured to control the variable oscillator to drive the first and second metal plates and transfer power to the flexible planar RF tag.

(AG) The charging device denoted as (AF), further including a current sensor electrically coupled with the microcontroller for sensing current through one of the first and second inductors. The microcontroller being configured to control the variable oscillator to operate at a resonance frequency of capacitors formed by the dielectric layer, the two antenna patches, and the first and second metal plates to maximize, based upon the sensed current, the power transferred from the charging device to the flexible planar RF tag.

What is claimed is:

1. A complementary patch antenna, comprising:
   a flexible substrate that is electrically non-conductive;
   a first antenna patch comprising metal positioned on a first side of the flexible substrate, the first antenna patch being sized to resonate at a center frequency and having a first edge with an edge length;
   a second antenna patch comprising metal positioned on the first side of the flexible substrate, the second antenna patch being sized to resonate at the center frequency and having a second edge with the edge length, wherein the second edge is parallel to the first edge and perpendicularly displaced from the first edge by a spacing that is no greater than one-quarter of a resonant length that is based on the center frequency, the edge length being greater than the spacing;
   a differential input having (i) a first feed element comprising metal electrically connected to the first antenna patch and (ii) a second feed element comprising metal electrically connected to the second antenna patch and electrically isolated from the first feed element; and
   a ground plane comprising metal positioned on a second side of the flexible substrate, opposite the first side, and at least partially under the first and second antenna patches.

2. The complementary patch antenna of claim 1, wherein the first and second antenna patches have similar geometries.

3. The complementary patch antenna of claim 2, wherein each of the first and second antenna patches is rectangular.

4. The complementary patch antenna of claim 1, wherein:
   the center frequency is between 3.35 and 10.35 GHz; and
   a bandwidth of the complementary patch antenna is greater than or equal to 500 MHz.

5. The complementary patch antenna of claim 1, wherein:
   the first feed element electrically connects to an edge of the first antenna patch other than the first edge; and
   the second feed element electrically connects to an edge of the second antenna patch other than the second edge.

6. The complementary patch antenna of claim 1, further comprising a transceiver circuit located on the flexible substrate and electrically connected to the differential input such that the transceiver circuit differentially drives the first and second antenna patches.

7. The complementary patch antenna of claim 6, further comprising a flexible battery for powering the transceiver circuit.

8. The complementary patch antenna of claim 7, further comprising a flexible waterproof enclosure that encapsulates the flexible substrate and the flexible battery.

9. The complementary patch antenna of claim 8, further comprising an electrical connector positioned at least partially outside of the waterproof enclosure to receive electrical power for charging the flexible battery.

10. The complementary patch antenna of claim 9, further comprising a regulator circuit located on the flexible substrate, positioned within the flexible waterproof enclosure, electrically connected between the electrical connector and the flexible battery, and configured to charge the flexible battery with the electrical power.

11. A method for real-time location tracking, comprising transmitting or receiving a wireless signal with the complementary patch antenna of claim 1.

12. The method of claim 11, wherein:
   the center frequency is between 3.35 and 10.35 GHz; and
   said transmitting or receiving uses a bandwidth that is greater than or equal to 500 MHz.

13. The method of claim 11, wherein said transmitting includes differentially driving the first and second antenna patches.

14. The method of claim 11, wherein said receiving includes differentially receiving from the first and second antenna patches.

15. The method of claim 11, further comprising tracking a position of an athlete based on the transmitted wireless signal when the complementary patch antenna is affixed to the athlete.

16. The method of claim 15, further comprising affixing the complementary patch antenna to the athlete.

17. The method of claim 11, wherein:
   the first feed element electrically connects to an edge of the first antenna patch other than the first edge; and
   the second feed element electrically connects to an edge of the second antenna patch other than the second edge.

18. The method of claim 11, wherein:
the complementary patch antenna further includes:
- a flexible battery;
- a flexible waterproof enclosure that encapsulates the flexible substrate and the flexible battery; and
- an electrical connector positioned at least partially outside of the waterproof enclosure; and the method further includes:
- receiving electrical power via the electrical connector; and
- charging the flexible battery with the electrical power.

19. The complementary patch antenna of claim 1, wherein the first and second antenna patches, when differentially driven via the differential input, transmit more power along opposing forward and backward directions than along opposing first and second sideways directions, the first and second sideways directions being parallel to the first and second edges and lying within a plane of the first and second antenna patches, the forward and backward directions being perpendicular to the first and second sideways directions and lying within the plane of the first and second antenna patches.

* * * * *